United States Patent
Lin et al.

(10) Patent No.: US 12,032,769 B2
(45) Date of Patent: Jul. 9, 2024

(54) FORCE-SENSING PROCESSING METHOD OF A TOUCHPAD

(71) Applicant: ELAN MICROELECTRONICS CORPORATION, Hsinchu (TW)

(72) Inventors: Shih-Hao Lin, Taichung (TW); Ying-Jie Liu, Zhubei (TW); Hsueh-Wei Yang, Zhubei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 18/361,120

(22) Filed: Jul. 28, 2023

(65) Prior Publication Data

US 2024/0045535 A1    Feb. 8, 2024

(30) Foreign Application Priority Data

Aug. 5, 2022   (TW) .................................. 111129613

(51) Int. Cl.
*G06F 3/041*   (2006.01)

(52) U.S. Cl.
CPC .................. *G06F 3/0414* (2013.01)

(58) Field of Classification Search
CPC .. G06F 3/0414; G06F 3/04144; G06F 3/0418; G06F 2203/04105; G06F 3/03547; G06F 3/016; G06F 3/0416
See application file for complete search history.

(56) References Cited

U.S. PATENT DOCUMENTS

| | | | |
|---|---|---|---|
| 2015/0049064 A1* | 2/2015 | Shin | G06F 3/0445 345/178 |
| 2016/0259467 A1* | 9/2016 | Nayyar | G06F 3/041661 |
| 2017/0285857 A1* | 10/2017 | Kuan | G06F 3/0446 |
| 2020/0064952 A1 | 2/2020 | Gupta et al. | |

FOREIGN PATENT DOCUMENTS

| | | |
|---|---|---|
| CN | 102346597 A | 2/2012 |
| CN | 103870048 A | 6/2014 |
| CN | 112214133 A | 1/2021 |
| TW | 201110004 A1 | 3/2011 |
| TW | 201621563 A | 6/2016 |
| TW | 201621563 A1 | 6/2016 |

* cited by examiner

*Primary Examiner* — Rodney Amadiz
(74) *Attorney, Agent, or Firm* — patenttm.us

(57) ABSTRACT

A force sensing processing method of a touchpad is provided. The comparison values obtained by subtracting the force induction quantities of different frames are used to determine whether the achievement conditions are met. If it is met, a processing step is executed to respond the event to be triggered by the changing trend of the user's force. When the force changes rapidly and the force sensing amount cannot be quickly returned to the originally set trigger threshold value, the force changing trend detected by the comparison values are be used to provide the processing steps in real time, so as to improve the user experience.

18 Claims, 8 Drawing Sheets

FORCE-SENSING PROCESSING METHOD OF A TOUCHPAD

CROSS-REFERENCE TO RELATED APPLICATIONS

This application is based upon and claims priority under 35 U.S.C. 119 from Taiwan Patent Application No. 111129613 filed on Aug. 5, 2022, which is hereby specifically incorporated herein by this reference thereto.

BACKGROUND OF THE INVENTION

1. Field of the Invention

The present invention relates to a touchpad, especially to a touchpad with a force-sensing function.

2. Description of the Prior Arts

With reference to FIGS. 6 and 7, a conventional touchpad in accordance with the prior art comprises a substrate 10, a force-sensing layer 11, a spacer layer 12, a touch-sensing layer 13 and a protective layer 14. The force-sensing layer 11 is mounted on the substrate 10. The spacer layer 12 is mounted on the force-sensing layer 11. The touch-sensing layer 13 is mounted on the spacer layer 12. The protective layer 14 is mounted on the touch-sensing layer 13. The spacer layer 12 has multiple deformation units 121 disposed separately therein. When the user's finger 20 applies downward pressure on the protective layer 14, the deformation units 121 in the spacer layer 12 generate different amounts of deformation based on the magnitude of the applied force and the distance from the point of the force application. The varying deformation amounts of the deformation units 12 cause the distance between the touch-sensing layer 13 and the force-sensing layer 11 at different positions to change. As a result, different force-sensing values are generated in the force-sensing layer 11 based on the magnitude of the force applied. The magnitude of the force-sensing values is used to determine the magnitude of the force applied by the user. When the user releases the applied force, the deformation units 121 gradually recover their shape due to the elasticity as they no longer experience external force. This leads to a gradual restoration of the distance between the touch-sensing layer 13 and the force-sensing layer 11 to an unloaded state, resulting in a gradual return of the force-sensing values to their initial state.

When the user performs rapid clicks, the user's finger 20 quickly changes the applied force within a very short period of time, resulting in a pattern of applying force, release, applying force, release, and so on. However, the elastic recovery of the spacer layer 12 requires a certain amount of time. In the case of rapid switching between force application and release, the spacer layer 12 cannot quickly recover to a state that accurately reflects the magnitude of the force during release. As a result, it quickly deforms again due to the reapplication of force, causing the detected force-sensing values to show variations in magnitude. However, due to the insufficient rate of elastic recovery of the spacer layer 12, the force-sensing values cannot decrease enough to indicate a release event. As shown in FIG. 8, when using a condition where the force-sensing value is greater than 200 for triggering a click event and less than 100 for triggering a release event, it is apparent that the user rapidly changes the applied force within a short period of time, attempting to create a continuous clicking effect. However, as mentioned above, due to the slow elastic recovery rate of the spacer layer 12, the force-sensing values have not decreased enough to trigger a release event before the user applies force again, causing the force-sensing values to increase. Therefore, although the user performs continuous clicking actions, the conventional touchpad fails to reflect the continuous clicking events, resulting in a poor user experience.

To overcome the shortcomings, the present invention provides a force-sensing processing method for a touchpad to mitigate or to obviate the aforementioned problems.

SUMMARY OF THE INVENTION

To achieve the objectives, the present invention provides a force-sensing processing method for a touchpad to effectively respond to continuous click events.

The present invention provides a force-sensing processing method comprising steps of: a force-sensing processing method for a touchpad comprising steps of: a. collecting force-sensing values of a touch object in different frames; b. obtaining a comparison value by calculating the force-sensing values collected in two of the frames; c. determining whether the comparison value meets a first achievement condition; and d. executing a first processing if the comparison value meets a first achievement condition.

The advantage of the present invention lies in obtaining the user's force trend by comparing the force-sensing values in different frames. Based on the force changing trend, the present invention determines whether the conditions are met and performs corresponding processing. By considering the relative values of force variation rather than solely relying on absolute values, the present invention effectively responds the relative force changes in the case of continuous clicking. This enables the touchpad to make real-time determinations and thus enhances the user experience.

Other objectives, advantages and novel features of the invention will become more apparent from the following detailed description when taken in conjunction with the accompanying drawings.

DETAILED DESCRIPTION OF THE EMBODIMENTS

Figure 1:
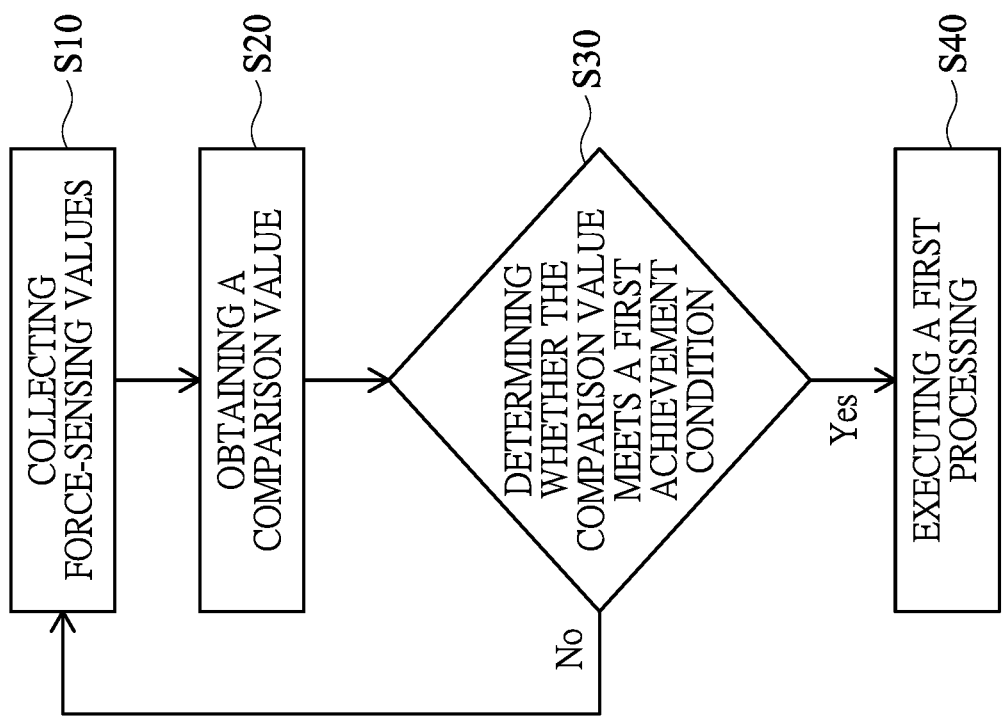
FIG. 1 is a flow chart of a force-sensing processing method in accordance with the present invention.

With reference to FIG. 1, a first embodiment of a force-sensing processing method in accordance with the present invention comprises the following steps.

Figure 2:
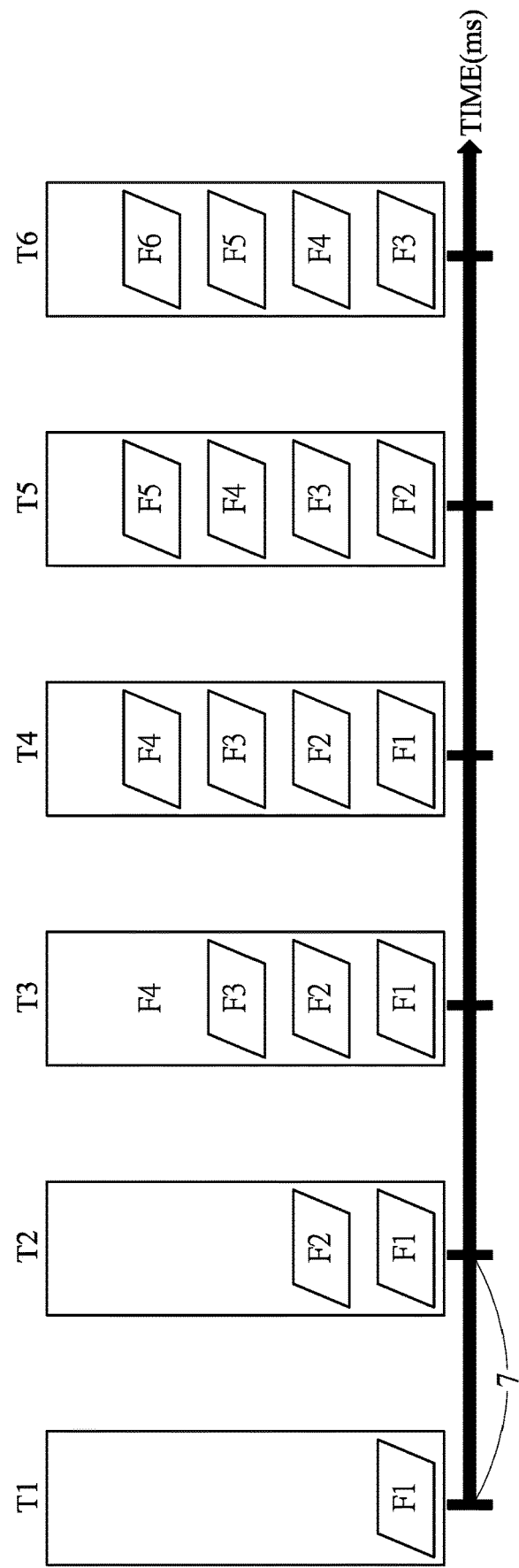
FIG. 2 is a timing diagram illustrating the frames at different time when the force-sensing processing method in FIG. 1 is operating.

Collecting force-sensing values of a touch object on a touchpad in different frames (S10): With further reference to FIG. 2, the touchpad senses the force-sensing values generated by the touch object exerting force on the touchpad. The touchpad collects the force-sensing values at a preset frame rate. Using the frame rate of 144 Hz as an example, the force-sensing value is obtained once in an average of about 7 microseconds (ms). Assuming the time T1 shown in FIG. 2 is an initial time, the corresponding frame at the time T1 is the frame F1, the corresponding frame at the time T2 is the frame F2, the corresponding frame at the time T3 is the frame F3, and the corresponding frame at the time T4 is the frame F4, the frame corresponding to the time T5 is the frame F5, the frame corresponding to the time T6 is the frame F6, and so on. Then the force-sensing value of the frame F1 is obtained at the time T1, the force-sensing value of the frame F2 is obtained at the time T2, etc. The touchpad saves the force-sensing values of the preset number of the frames. For example as shown in FIG. 2, the touchpad saves the force-sensing values of four frames, but it is not limited thereto. When the force-sensing value of the frame F5 is obtained, the force-sensing values of the frames F2 to F5 are preserved and the force-sensing values of the frame F1 is abandoned.

Obtaining a comparison value (S20): The comparison value is a subtraction of the force-sensing values obtained in different frames. In one embodiment, the force-sensing value of the $n^{th}$ frame minus the force-sensing value of the n–$m^{th}$ frame to obtain the comparison value. The "n" and "m" are positive integers, and n is larger than m. Since the comparison value is used to determine whether the changing trend of the force-sensing values is increasing or decreasing, the change of force-sensing values in adjacent frames may be misjudged due to inadvertent operation. Thus, in one embodiment, m is larger or equal to 2. It means to determine the changing trend of the force-sensing values by comparing the force-sensing values separated by at least one frame. As shown in FIG. 2 and using that m is equal to 2, the comparison value is obtained by subtracting the force-sensing value of the frame F1 from the force-sensing value of the frame F3, subtracting the force-sensing value of the frame F2 from the force-sensing value of the frame F4, and so on. In one embodiment, it further determines that whether the amount of the frames of the collected force-sensing values is larger than m+1 in the step S10. If so, the step S20 is executed. If not, the step S10 is kept executing.

Determining whether the comparison value meets a first achievement condition (S30): Since the comparison value presents a changing trend of the force-sensing values, determining whether the comparison value meets the first achievement condition is to determine whether the changing trend of the force-sensing values has reached a preset condition that needs to be adjusted. If the first achievement condition is met, a first processing (S40) is executed so that the changing trend of the exerting force by the touch object are responded in time. If the first achievement condition is not met, the step S10 is executed.

In one embodiment, to determine when the comparison value meets the first achievement condition is to determine whether the comparison value is less than a first threshold. The first threshold is a negative value. For example, the force-sensing value of the frame that occurred later minus the force-sensing value of the frame that occurred earlier. As shown in FIG. 2, the force-sensing value of the frame F4 minus the force-sensing value of the frame F2. If the comparison value is less than the first threshold, it means that the force-sensing value of the later frame is less than the force-sensing value of the earlier frame, indicating that the change of the force-sensing value shows a decreasing trend. Then when the decreasing trend reaches the preset condtion that needs to be adjusted, the first processing is still actuated because the comparison value has met the first achievement condition. In this way, the change of the force applied by the user responds in time by the changing trend of the force-sensing values, and the first processing is actuated.

In one embodiment, when it is determined that the comparison value is less than the first threshold in the $n^{th}$ frame, the first processing refers to lowering the force-sensing value of the $n^{th}$ frame to a preset force-sensing value. The preset force-sensing value relates to a determination standard of a releasing event. In one embodiment, the preset force-sensing value is less than a releasing threshold. When the force-sensing value is less than the release threshold, it is determined that the user decreases the applied force to actuate the release event. Therefore, the preset force-sensing value is less than the release threshold means that the adjusted force-sensing value can actuate the release event. For the touchpad, the adjusted force-sensing value is recognized as the current real force-sensing value and is used to determine whether to trigger the release event. In another aspect, When the touchpad transmits the force-sensing value information to the electronic device, the touchpad recognizes the reduced force-sensing value as the current real force-sensing value and sends it to the electronic device. The action or event to be triggered is further determined by the electronic device according to the reduced force-sensing value.

Figure 3:
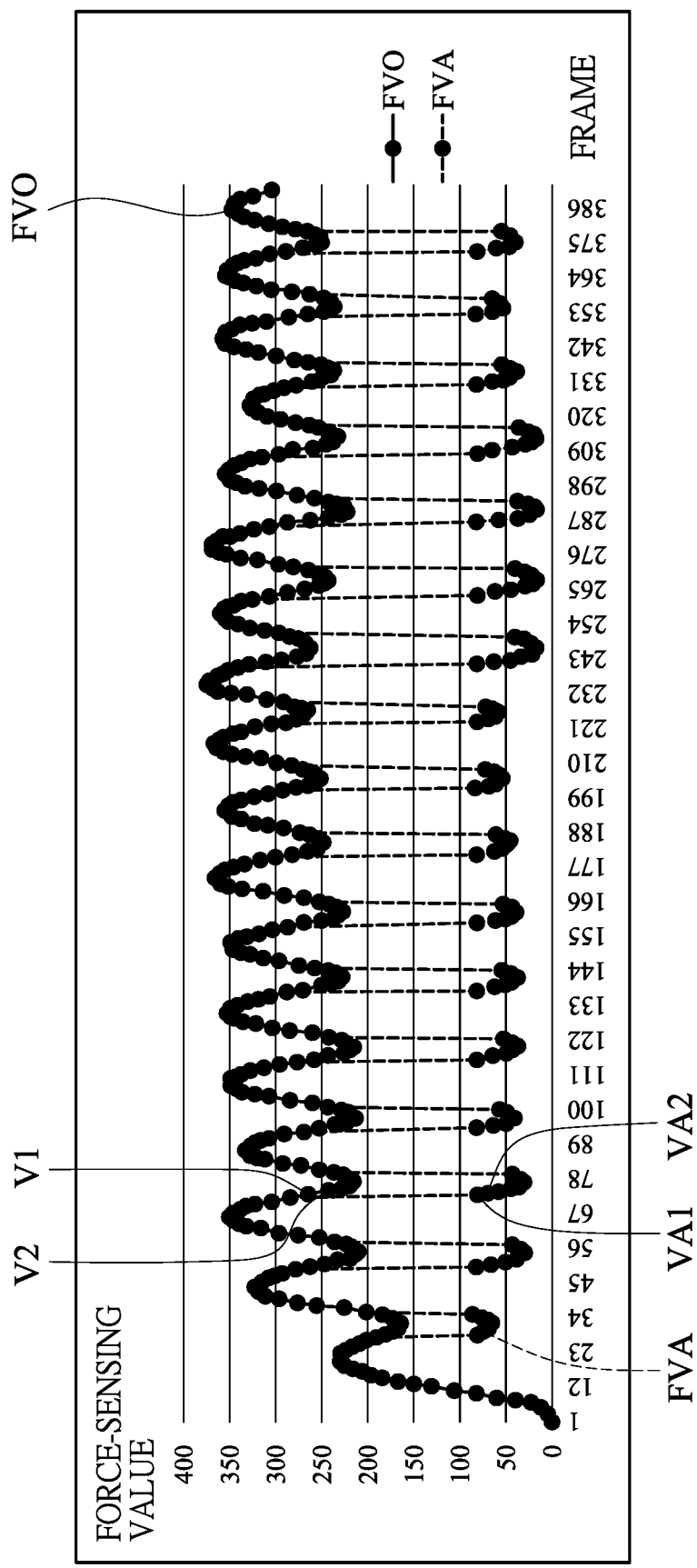
FIG. 3 is a relationship chart illustrating the frames and the force-sensing values when the force-sensing processing method in FIG. 1 is operating.

For example, as shown in FIG. 3, the force-sensing values detected by the touchpad are drawn as an original force-sensing value line FVO. The force-sensing values after adjustment are drawn as a virtual force-sensing value line FVA. The release threshold is 100. It can be clearly seen from FIG. 3 that the slope of the original force-sensing line FVO is relatively large, which means that the force applied by the user changes quite rapidly. When the applied force changes rapidly, the spacer layer in the middle of the touchpad has no time to return to its original shape when the user releases the force, which causes the force-sensing value to drop not fast enough. Therefore, it can be seen that although the force-sensing line FVO quickly presents the situation of applying force→releasing→applying force→releasing . . . , it cannot trigger the release event. For example, the force-sensing value V1 detected at the $72^{nd}$ frame is 260, which is not less than the release threshold value of 100, and the release event is not directly triggered. However, under the determination of step S30, it is considered that the comparison value has met the first achievement condition at this time, and the first processing must be performed. That is, it is determined at the $72^{nd}$ frame that the downward trend of the force-sensing value has reached, and the release event should be triggered. Therefore, the force-sensing value of the $72^{nd}$ frame is subjected to the first processing, i.e. that the force-sensing value of the $72^{nd}$ frame is reduced to a preset force-sensing value VA1, which is 80 as shown in FIG. 3. At this time, because the preset force-sensing value VA1 is less than the release threshold value 100, the release event is triggered. Furthermore, when it is determined in the n–$1^{th}$ frame that the comparison value is not less than the first threshold, and in the $n^{th}$ frame it is determined that the comparison value is less than the first threshold, and in the n+$1^{th}$ frame it is determined that the comparison value is still less than the first threshold, the force-sensing value in the n+$1^{th}$ frame is adjusted based on the ratio of the force-sensing value in the $n^{th}$ frame to the preset force-sensing value. Specifically, the force-sensing value in the $72^{nd}$ frame is still used as an example. At the $71^{st}$ frame, it is determined that the comparison value is not less than the first threshold, so the force-sensing value at the $71^{st}$ frame is not adjusted. However, at the $72^{nd}$ frame, it is determined that the comparison value is less than the first threshold, and the force-sensing value V1 (260 as shown in FIG. 3) is lowered to the preset force-sensing value VA1 (80 as shown in FIG. 3). At this time, the next frame is the $73^{rd}$ frame, and it is still determined that the comparison value is less than the first threshold, then the force-sensing value V2 at the $73^{rd}$ frame (240 as shown in FIG. 3) is adjusted according to the ratio (260/80) of the force-sensing value V1 (260) at the $72^{nd}$ frame to the preset force-sensing value VA1 (80), which becomes the adjusted force-sensing value VA2 (about 74). By analogy, the force-sensing values of subsequent frames are adjusted until the comparison value is no longer less than the first threshold.

Figure 4:
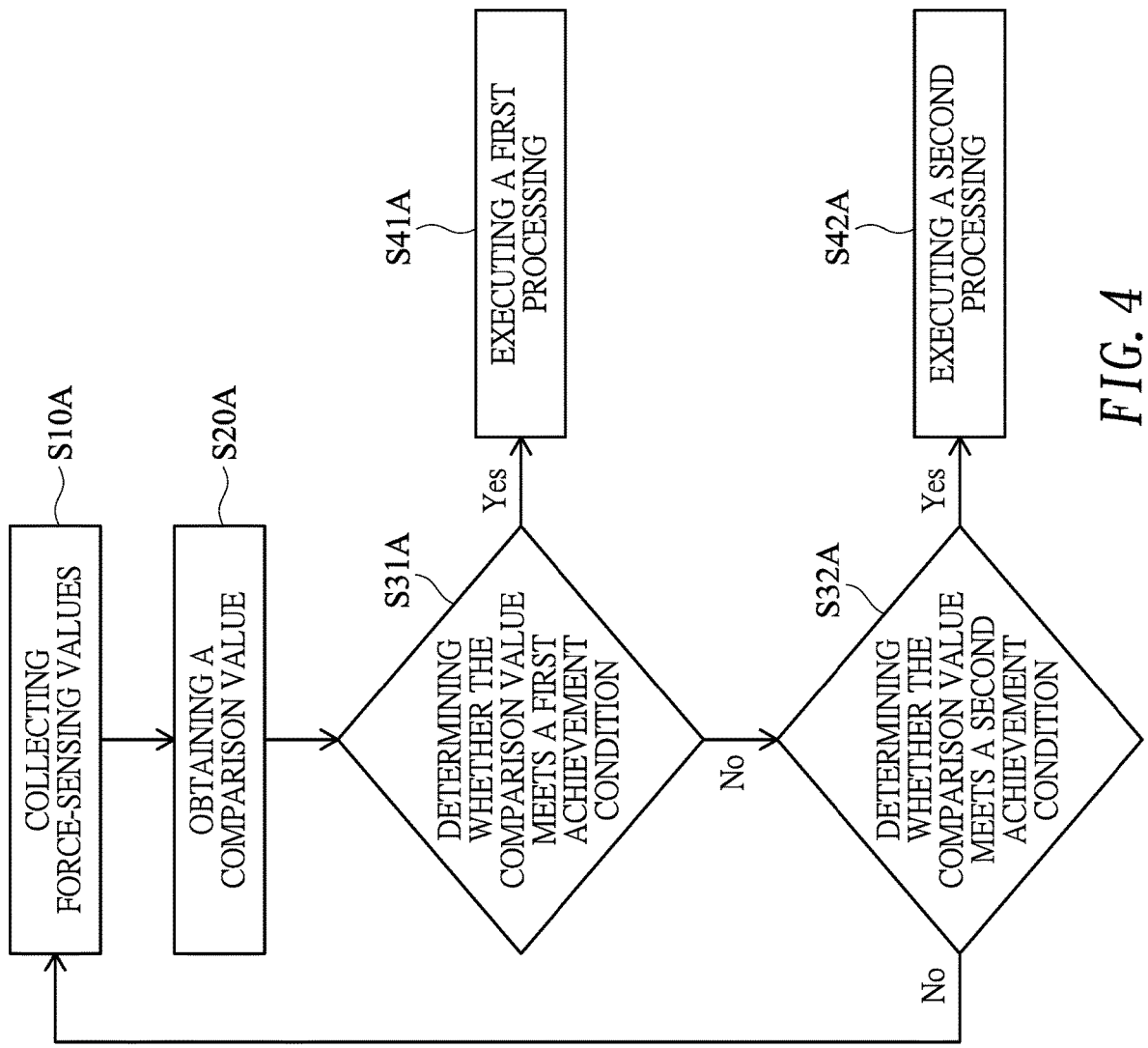
FIG. 4 is a flow chart of another embodiment of a force-sensing processing method in accordance with the present invention.

With reference to FIG. 4, a second embodiment of a force-sensing processing method in accordance with the present invention comprises similar steps to the first embodiment: collecting force-sensing values of a touch object on a touchpad in different frames (S10A), obtaining a comparison value (S20A), determining whether the comparison value meets a first achievement condition (S31A), executing a first processing if the step S31A determines the comparison value meets a first achievement condition (S41A), and further comprises following steps:

Determining whether the comparison value meets a second achievement condition if the step S31A determines the comparison value does not meet the first achievement condition (S32A): Since the comparison value presents a changing trend of the force-sensing values, determining whether the comparison value meets the second achievement condition when the comparison value does not meet the first achievement condition is to determine whether the changing trend of the force-sensing values has reached a preset condition that needs to be adjusted. If the second achievement condition is met, a second processing (S42A) is executed to respond to the changing trend of the force-sensing values so that the changes of the exerting force by the touch object are responded in time. If the second achievement condition is not met, the step S10A is executed.

In one embodiment, to determine when the comparison value meets the first achievement condition is to determine whether the comparison value is less than a first threshold. The first threshold is a negative value. To determine when the comparison value meets the second achievement condition is to determine whether the comparison value is larger than a second threshold. The second threshold is a positive value. For example, the force-sensing value of the frame that occurred later minus the force-sensing value of the frame that occurred earlier. As shown in FIG. 2, the force-sensing value of the frame F4 minus the force-sensing value of the frame F2. If the comparison value is less than the first threshold, it means that the force-sensing value of the later frame is less than the force-sensing value of the earlier frame, indicating that the change of the force-sensing value shows a decreasing trend. Then when the decreasing trend reaches the preset condition that needs to be adjusted, the first processing is still actuated because the comparison value has met the first achievement condition. In the same manner, If the comparison value is larger than the second threshold, it means that the force-sensing value of the later frame is larger than the force-sensing value of the earlier frame, indicating that the change of the force-sensing value shows an increasing trend. Then when the increasing trend reaches the preset condition that needs to be adjusted, the second processing is actuated.

In one embodiment, when the comparison value is determined as less than the first threshold, the first processing means to determine that the touch object triggers a release event. When the comparison value is determined as larger than the second threshold, the second processing means to determine that the touch object triggers a click event.

Figure 5:
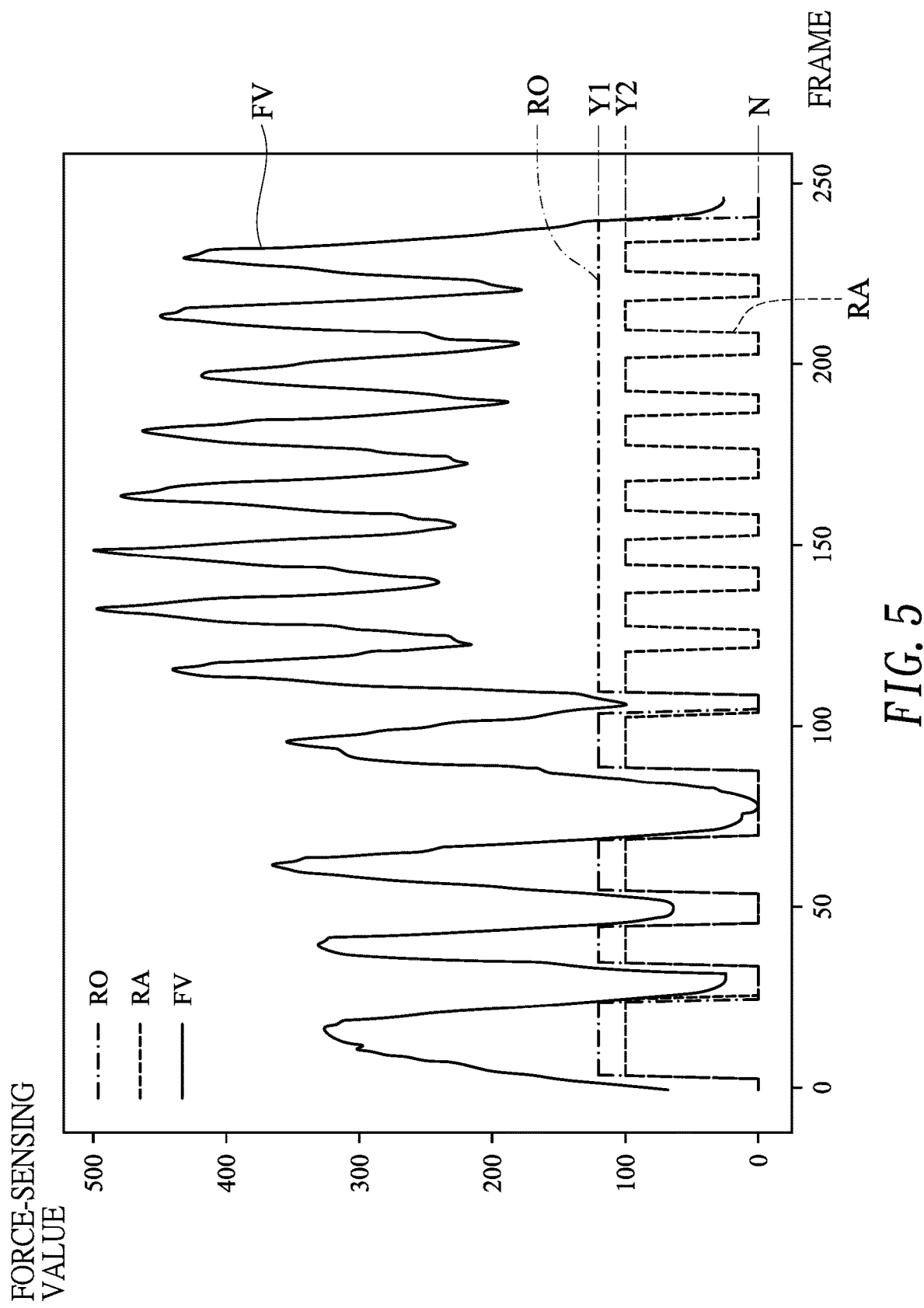
FIG. 5 is a relationship chart illustrating the frames and the force-sensing values when the force-sensing processing method in FIG. 4 is operating.
Figure 6:
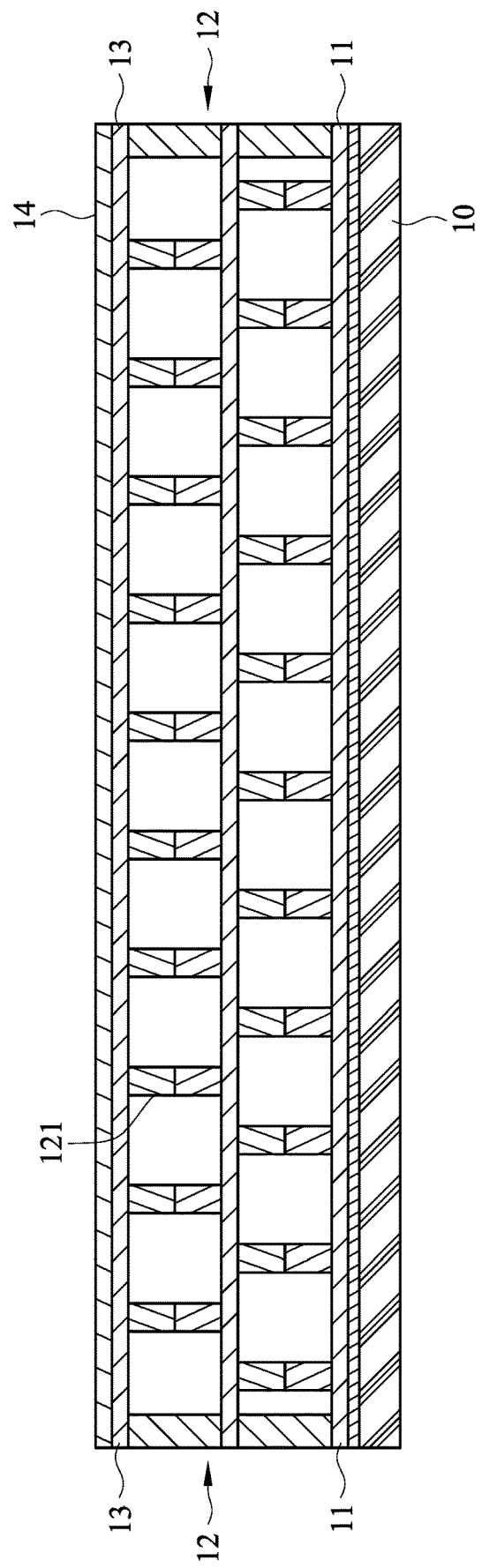
FIG. 6 is a side view in a partial section of a conventional touchpad in accordance with the prior art.
Figure 7:
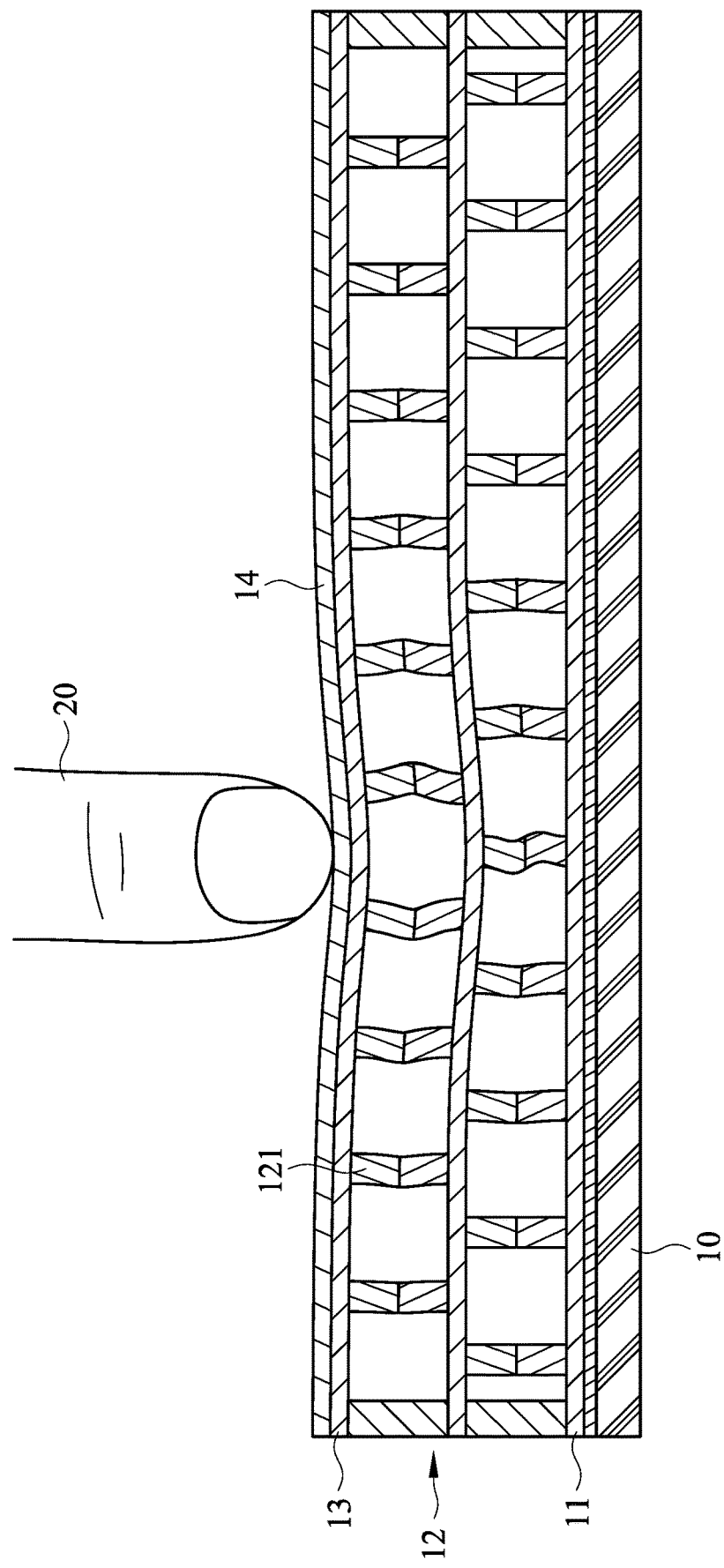
FIG. 7 is an operational side view in a partial section of the conventional touchpad in FIG. 6.
Figure 8:
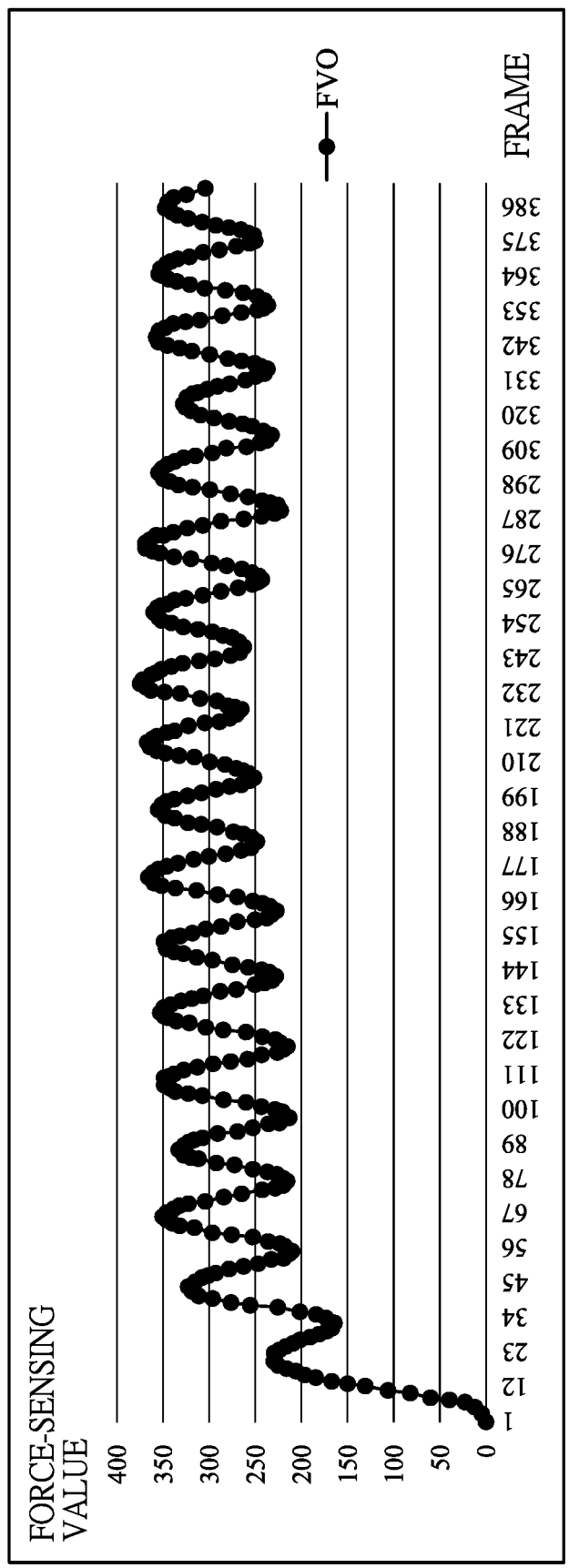
FIG. 8 is a relationship chart illustrating the frames and the force-sensing values when the conventional touchpad in FIG. 6 is operated.

For example, as shown in FIG. 5, the force-sensing values detected by the touchpad are drawn as a force-sensing value line FV. The release threshold is preset as 125, and the click threshold is preset as 150. FIG. 5 also shows a first result line RO for determining whether to trigger a click event (Y1) or a release event (N) according to a comparison result of the force-sensing values with the release threshold and the click threshold. FIG. 5 also shows a second result line RA for determining whether to trigger a click event (Y2) or a release event (N) according to the method described in the second embodiment of the present invention. Before the $100^{th}$ frame, the slope of the force-sensing value line FV is small, which means that the force applied by the user does not change very quickly. Therefore, the comparison between the value of the force-sensing value itself and the release threshold and the click threshold is enough to determine whether to trigger the click event and the release event. Then the determination of the first result line RO or the determination of the second result line RA are consistent. After about the $100^{th}$ frame, it can be seen that the slope of the force-sensing line FV becomes larger, which means that the force applied by the user changes quite rapidly. When the applied force changes rapidly, the spacer layer in the middle of the touchpad has no time to return to its original shape when the user releases the force, which causes the force-sensing value to drop not fast enough. Therefore, it can be seen that although the force-sensing line FV quickly presents the situation of applying force→releasing→applying force→releasing . . . , the force-sensing value is not less than the release threshold and cannot trigger the release event. Then as shown by the first result line RO, it continues to trigger the click event. However, after the above-mentioned first processing and second processing are performed by the method of the second embodiment of the present invention, it is determined according to the changing trend whether the increase or decrease of the force-sensing value is enough to trigger the click event or the release event. Then, it is presented as a second result line RA, effectively triggering the click event or the release event according to the changing trend of applied force.

In summary, the method as described utilizes the comparison values of force-sensing values in different frames to obtain the changing trend of the applied force. Based on the changing trend of the applied force, the method as described performs corresponding processing, such as adjusting force-sensing value or triggering click or release events. By responding to the desired effect of the user's current operation in real-time according to the changing trend of the applied force, the method as described effectively enhances user experience.

Moreover, in one embodiment, before executing the aforementioned step S20 or S20A, it is first determined whether the force-sensing value of the frame collected in the step S10 or S10A is greater than a third threshold. If the force-sensing value of the frame collected in the step S10 or S10A is determined as greater than the third threshold, the step S20 or S20A is executed to obtain the comparison value. That is to say when the force-sensing value has not yet reached the third threshold, it means that the applied force by the user has not triggered the click event yet. Thus, the changing trend of force application may have no reference value. Then there is no need to obtain the comparison value and make subsequent determinations and processing.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A force-sensing processing method for a touchpad comprising steps of:
   a. collecting force-sensing values corresponding to a touch object in different frames;
   a1. determining whether the force-sensing value of one of the frames is larger than a third threshold; if the force-sensing value of the frame is larger than the third threshold, determining that the touch object triggers a click event and executing a step b; and if the force-sensing value of the frame is not larger than the third threshold, executing step a;
   b. obtaining a comparison value by calculating the force-sensing values collected in two of the frames;
   c. determining whether the comparison value meets a first achievement condition; and
   d. executing a first processing if the comparison value meets a first achievement condition.

2. The force-sensing processing method for a touchpad as claimed in claim 1, wherein in step b, the comparison value of $n^{th}$ frame is obtained by subtracting a force-sensing value of $n-m^{th}$ frame from a force-sensing value of $n^{th}$ frame;
   wherein in step a1, the determining whether the force-sensing value of one of the frames is larger than a third threshold occurs before the $n^{th}$ frame;
   n is a positive integer larger than m; and
   m is a positive integer larger than or equal to 2.

3. The force-sensing processing method for a touchpad as claimed in claim 2, wherein
   in the step c, determining whether the comparison value meets the first achievement condition is to determine whether the comparison value is less than a first threshold; and
   the first threshold is a negative value.

4. The force-sensing processing method for a touchpad as claimed in claim 3, wherein the first processing in the step d is to trigger a release event.

5. The force-sensing processing method for a touchpad as claimed in claim 3, wherein
   the first processing in the step d is to adjust a force-sensing value of the $n^{th}$ frame to a preset force-sensing value; and
   the present force-sensing value is used for a determination of a release event.

6. The force-sensing processing method for a touchpad as claimed in claim 5, wherein when it is determined in the $n-1^{th}$ frame that the comparison value is not less than the first threshold, in the $n^{th}$ frame it is determined that the comparison value is less than the first threshold, and in the $n+1^{th}$ frame it is determined that the comparison value is still less than the first threshold, the force-sensing value in the $n+1^{th}$ frame is adjusted based on a ratio of the force-sensing value in the $n^{th}$ frame to the preset force-sensing value.

7. The force-sensing processing method for a touchpad as claimed in claim 6, wherein
   the step c also comprises a step of determining whether the comparison value meets a second achievement condition; and
   the step d also comprises a step of executing a second processing if the comparison value meets the second achievement condition.

8. The force-sensing processing method for a touchpad as claimed in claim 7, wherein
   in the step c, determining whether the comparison value meets the second achievement condition is to determine whether the comparison value is larger than a second threshold;
   the second threshold is larger than the first threshold; and
   the second threshold is a positive value.

9. The force-sensing processing method for a touchpad as claimed in claim 8, wherein the second processing in the step d is to determine that the touch object triggers a click event.

10. The force-sensing processing method for a touchpad as claimed in claim 6, wherein the step a further comprises steps of
    determining whether an amount of the frames of the collected force-sensing values is larger than m+1;
    executing the step b if the amount of the frames of the collected force-sensing values is larger than m+1; and
    executing the step a if the amount of the frames of the collected force-sensing values is not larger than m+1.

11. The force-sensing processing method for a touchpad as claimed in claim 3, wherein
    the step c also comprises a step of determining whether the comparison value meets a second achievement condition; and
    the step d also comprises a step of executing a second processing if the comparison value meets the second achievement condition.

12. The force-sensing processing method for a touchpad as claimed in claim 11, wherein the second processing in the step d is to determine that the touch object triggers a click event.

13. The force-sensing processing method for a touchpad as claimed in claim 2, wherein the step c also comprises a step of determining whether the comparison value meets a second achievement condition; and the step d also comprises a step oft executing a second processing if the comparison value meets the second achievement condition.

14. The force-sensing processing method for a touchpad as claimed in claim 13, wherein
    in the step c, determining whether the comparison value meets the second achievement condition is to determine whether the comparison value is larger than a second threshold;
    the second threshold is larger than the first threshold; and
    the second threshold is a positive value.

15. The force-sensing processing method for a touchpad as claimed in claim 14, wherein the second processing in the step d is to determine that the touch object triggers a click event.

16. The force-sensing processing method for a touchpad as claimed in claim 1, wherein
    the step c also comprises a step of determining whether the comparison value meets a second achievement condition; and
    the step d also comprises a step of executing a second processing if the comparison value meets the second achievement condition.

17. The force-sensing processing method for a touchpad as claimed in claim 16, wherein the second processing in the step d is to determine that the touch object triggers a click event.

18. A force-sensing processing method for a touchpad comprises steps of:
   a. collecting force-sensing values corresponding to a touch object in different frames;
   a00. determining whether an amount of the frames of the collected force-sensing values is larger than m+1, wherein m is a positive integer larger than or equal to 2;
   a01. executing a step b if the amount of the frames of the collected force-sensing values is larger than m+1;
   a02. executing the step a if the amount of the frames of the collected force-sensing values is not larger than m+1;
   b. obtaining a comparison value by calculating the force-sensing values collected in two of the frames;
   c. determining whether the comparison value meets a first achievement condition; and
   d. executing a first processing if the comparison value meets a first achievement condition.

\* \* \* \* \*